United States Patent [19]

Zapico

[11] Patent Number: 4,990,608

[45] Date of Patent: Feb. 5, 1991

[54] DIAPHRAGM WALL CONSTRUCTION GELATIN COMPOSITION

[75] Inventor: José Zapico, Val de Reuil, France

[73] Assignee: Aqualon Company, Wilmington, Del.

[21] Appl. No.: 362,587

[22] Filed: Jun. 7, 1989

[51] Int. Cl.$^5$ ............... C08B 11/00; C08B 11/20; C08B 11/193

[52] U.S. Cl. ................................ 536/84; 536/88; 536/90; 536/91

[58] Field of Search ............ 536/50, 51, 52, 84, 536/88, 90, 91, 95, 96, 97, 98, 99, 100, 111, 112, 120, 132, 130, 131

[56] References Cited

U.S. PATENT DOCUMENTS

| | | | |
|---|---|---|---|
| 3,378,070 | 4/1968 | Wessler et al. | 536/96 |
| 3,498,971 | 3/1970 | Blaga et al. | 536/98 |
| 3,571,188 | 4/1971 | Takehara et al. | 536/98 |
| 4,228,277 | 10/1980 | Landoll | 536/90 |
| 4,336,146 | 6/1982 | Majewicz et al. | 252/8.55 R |
| 4,720,303 | 1/1988 | Soldatos | 106/181 |
| 4,798,888 | 1/1989 | Symes et al. | 536/114 |
| 4,799,962 | 1/1989 | Ahmed | 106/188 |

OTHER PUBLICATIONS

Ullmanns Encyklopadie der technischen Chemie, Band 9, 1975.

*Primary Examiner*—Nathan M. Nutter
*Attorney, Agent, or Firm*—James K. Luchs

[57] ABSTRACT

Carboxymethylcellulose (CMC) and hydroxyethylcellulose (HEC) are preferred modified polysaccharides providing at least 10% by weight gelatin particles to prevent fluid loss during diaphragm wall construction. A 1% solution of CMC or HEC give a 1000 cps viscosity at 25° C. An oil slurry comprises:

| | |
|---|---|
| Solvent | 45 |
| Surfactant | 2.5 |
| Water | 6 |
| Organophillic clay | 1 |
| Modified cellulose | 45.5 |

5 Claims, No Drawings

DIAPHRAGM WALL CONSTRUCTION GELATIN COMPOSITION

FIELD OF THE INVENTION

The invention relates to diaphram walls used in construction. The invention provides a water retention fluid of gelatinous polymer for use in diaphram wall construction.

BACKGROUND OF THE INVENTION

Bentonite clay is commonly used to retain water within diaphram walls during construction. A disadvantage of this material is that the clay must be disposed of after it has served its purpose.

Ullmans Encyclopadie der technischen Chemie, 4th Edition, Vol. 9, pp. 192,209, refers to the use of water-soluble cellulose ethers such as sodium carboxymethylcellulose for use for diaphram wall construction. Modified cellulose ethers and their use as thickeners and dispersion agents are described in U.S. Pat. Nos. 4,228,277, 4,336,146, 4,720,303 and 4,799,962.

But in spite of what was previously published and known to workers in the construction field, prior attempts to use cellulosic polymers for diaphram wall construction were not completely satisfactory due to the inability to prevent water loss from the filled trench into the surrounding soil. As a result, clay continued to be used for diaphram wall construction in spite of the environmental advantages of the use of a biodegradable polymer such as cellulose.

SUMMARY OF THE INVENTION

A modified polysaccharide composition is suitable for diaphram wall construction wherein a 1% solids solution of the polysaccharide gives a viscosity of at least 1000 cps at 25° C. and a mixture of the polysaccharide in water produces at least 10% by weight gelatinous particles.

Preferred modified polysaccharides give a viscosity of at least 2000 cps and produce at least 20% gelatinous particles and with a degree of substitution of 0.8 are carboxymethylcellulose (CMC) or hydroxyethylcellulose (HEC) with a molar substitution of 2.0-2.5.

A slurry for diaphram wall construction comprises on a weight percent basis:

| Solvent | 40–80% |
| --- | --- |
| Surfactant | 0.5–5% |
| Water | 0–10% |
| Organophillic clay | 0.5–5% |
| Modified cellulose | 20–60% |

A preferred slurry comprises:

| Paraffin oil | 45% |
| --- | --- |
| Surfactant | 2.5% |
| Water | 6% |
| Organophillic Clay | 1% |
| CMC or HEC | 45.5% |

DETAILED DESCRIPTION OF THE INVENTION

Diaphram wall construction is common civil engineering practice for the construction of large buildings. A trench is dug around the perimeter of the building and filled with concrete to form the walls. During the digging process, the trench is kept filled with water to prevent the sides of the trench from collapsing. In order to prevent the water from migrating from the trench to the surrounding soil the water must be thickened.

Bentonite which has been the practical choice for use in such trenches has several drawbacks.
  (1) Large quantities must be used because it is not an efficient thickener.
  (2) Bentonite forms a thick filter cake on the wall of the excavation which interferes with concrete pouring and bonding to the soil.
  (3) After the trench is filled with concrete, the displaced bentonite slurry creates a disposal problem.

It has now been discovered that the disadvantages of the prior art can be avoided with modified polysaccharides including carboxymethylcellulose, Guar, sugar beet pulp derivative and hydroxyethylcellulose. Also a more cost efficient wall can be produced according to the practice of the present invention.

When added to water these modified polysaccharide with suitable viscosity and solvation properties are observed to produce a thickened gelatinous slurry which does not rapidly convert to a solution. These polymers have a long solvation time either when added to water as a powder or in the form of an oil slurry.

Based upon a theoretical maximum degree of substitution of 3.0 for carboxymethyl cellulose; it has been discovered that a degree of substitution (D.S.) of at least 0.5 is required. It is preferred that D.S. be 0.8 or higher. In the case of hydroxyethylcellulose, molar substitution (M.S.) of at least 1.8 is required while 2.0 to 2.5 is preferred.

It has been discovered that in the case of low permeability soil a gelatinous particle content of at least 10% is required to prevent fluid loss. A gelatinous particle content of up to 20% is preferred. Depending on the soil permeability, the modified polysaccharide can be either dissolved by adding to water or dispersed in a slurry form. In low permeability soils a polymer solution can be applied directly, but for high permeability soils an oil slurry is added into the mud in a freshly dug diaphram construction trench.

A typical slurry formulation comprises in weight percent:

The solvent used to prepare the slurry can be diesel oil, liquid paraffin, mineral oil or vegetable oil.

Useful surfactants include imidazaline, lecithine, fatty acids soaps and other substances suitable for preparing a water in oil emulsion slurry.

Suitable organophillic clays include Bentone ® available from Ceca SA and clays from GeoServices, Paris, France.

As prepared according to the present invention, the slurry provides fast polymer swelling when added into the mud in a construction trench. Lumps are produced which coat the voids responsible for mud loss. These lumps comprise gelatinous particles which resist further solvation. It was unexpected to find that these gelatinous particles could be formed rapidly and still remain stable while protecting against fluid loss without being solubilized.

Expressed in different terms of both solid and liquid ingredients, the following ranges of variation are possible for practice of the invention:

| Solvent | 40 to 80% of the complete slurry |
| --- | --- |

| -continued | |
|---|---|
| Polymer | 20 to 60% of the complete slurry |
| Water | 0 to 20% of the liquid phase |
| Surfactant | 5 to 30 Kg/m³ of the liquid phase |
| Clay | 5 to 30 Kg/m³ of the liquid phase |

The following example illustrates the practice of the invention.

EXAMPLE 1

The following parts by weight of ingredients were combined to produce a slurry.

| | Parts |
|---|---|
| Paraffin oil | 45 |
| Geumol imidazaline surfactant available from GeoService, Paris, France | 2.5 |
| Tap Water | 6 |
| Organophillic clay available from GeoService, Paris, France | 1 |
| Carboxymethylcellulose Grade 7 from Aqualon Company having a 0.8 D.S. | 45.5 |

The slurry was poured into a diaphram construction trench filled with mud and freshly dug in a highly porous soil. A severe mud loss was observed initially, but the thick gelatinous slurry contained particles of carboxymethylcellulose which did not dissolve further coated the walls of the trench to prevent further fluid loss into the surrounding soil.

After the trench was complete around the perimeter of a construction site, concrete was poured into the trench and the mud was displaced.

A comparison diaphram construction trench filled with clay and carboxymethylcellulose polymer showed greater fluid loss than the invention.

What is claimed is:

1. A modified polysaccaride composition for diaphragm wall construction, characterized in that the composition comprises a carboxymethylcellulose (CMC) with a degree of substitution (D.S.) of at least 0.5 or a hydroxyethylcellulose (HEC) with a molar substitution (M.S.) between 1.8 and 2.5 wherein a 1% solids solution of either CMC or HEC gives a viscosity of at least 1000 CPS at 25° C. and a mixture of the CMC or HEC in water produces at least 10% by weight gelatinous particles.

2. The composition of claim 1 where the viscosity is at least 2000 CPS.

3. The composition of claim 2 used for low permeability soil.

4. The composition of claim 3 where the CMC has a D.S. of at least 0.8 and the HEC has a M.S. of 2.0–2.5.

5. The composition of claim 4 where the degree of gelatin is 20% or more.

* * * * *